Jan. 22, 1963    R. K. PETRY    3,074,114
METHOD FOR SMOOTHING AND GLOSSING VINYL PLASTIC SHEETS
Original Filed Aug. 23, 1952    5 Sheets-Sheet 2

FIG.2

INVENTOR.
ROBERT K. PETRY
BY
ATTORNEY

Jan. 22, 1963 R. K. PETRY 3,074,114
METHOD FOR SMOOTHING AND GLOSSING VINYL PLASTIC SHEETS
Original Filed Aug. 23, 1952 5 Sheets-Sheet 5

INVENTOR.
ROBERT K. PETRY
BY
ATTORNEY 3,074,114
METHOD FOR SMOOTHING AND GLOSSING VINYL PLASTIC SHEETS
Robert K. Petry, Mountain Lakes, N.J., assignor to Congoleum-Nairn, Inc., Kearny, N.J., a corporation of New York
Original application Aug. 23, 1952, Ser. No. 305,994. Divided and this application Mar. 31, 1953, Ser. No. 725,430
3 Claims. (Cl. 18—48)

This invention relates to a method for improving the surface of thermoplastic composition products. This application is a division of co-pending application S.N. 305,994, filed August 23, 1952, for "Method and Apparatus for Making Thermoplastic Composition Products," which issued as United States Patent 2,917,780 on December 22, 1959, which is a continuation-in-part of my application Serial No. 43,274, filed August 9, 1948, for "Process and Apparatus for Manufacturing Thermoplastic Products," and of my application Serial No. 93,126, filed May 13, 1949, for "Manufacture of Thermoplastic Resinous Sheet Material," both now abandoned.

More specific aspects of this invention relate to method and apparatus whereby such products may be successfully produced utilizing colored vinyl plastic composition comprising thermoplastic vinyl resin and filler.

Features and objects of this invention relate to steps and combinations of steps and to controls exercised therein whereby improvements in quality and uniformity are afforded, and whereby improved appearance is afforded both as regards surface finish and as regards the definition and distinctness of color contrasts in the case of products of variegated color.

In the manufacture of a product such as a smooth surface covering, it has long been recognized that the employment of a thermoplastic composition which is sufficiently hard and tough at ordinary temperatures to be resistant to wear and indentation offers certain advantages due chiefly to the fact that such a composition, if it can be successfully formed into a satisfactory sheet, is ready for use immediately after cooling from an elevated temperature at which the thermoplastic composition can be worked. Such properties of a thermoplastic composition are to be contrasted with those of conventional linoleum composition which depends on the use in the binder therefore of a drying oil such as linseed oil that hardens by oxidation. During the manufacture of a linoleum type floor covering the linoleum composition is initially prepared using a drying oil which is only in a partially oxidized condition whereby the linoleum composition at normal temperatures is of a putty-like consistency permitting it to be mixed, sheeted and made adherent to a suitable base sheet. However, such a linoleum type floor covering after its initial production is not ready for use due to the soft putty-like consistency of the layer of linoleum composition. In order to harden the layer of linoleum composition it is necessary to season it and such seasoning requires prolonged exposure to air at an elevated temperature in an operation which is costly both from the point of view of the time and labor involved and from the point of view of the size and cost of the equipment which is required. However, notwithstanding such disadvantages inherent in the use of linoleum composition or the like, the bulk of the flexible smooth surface coverings that have been manufactured and sold heretofore have been of the linoleum type comprising a molded layer of linoleum composition or have been of the type wherein a suitable paint or the like is applied to a suitable base sheet as by a printing operation. This has been due principally to the difficulties that have been encountered in successfully formulating and processing a thermoplastic composition whereby a commercially satisfactory product may be obtained. Moreover, while linoleum composition lends itself to processing whereby attractive floor coverings of variegated color may be obtained such as jaspe or marbleized coverings, especially severe difficulties have been encountered in connection with attempting to produce such products using a thermoplastic composition. According to this invention such difficulties have been successfully overcome and highly satisfactory flexible smooth surface coverings have been produced both of plain color and of variegated color using a thermoplastic composition material. It is an advantage of this invention that the aforesaid objectives have been attained in a manner which is economical and practical and by which accurately reproducible results are obtainable at a high production rate.

One of the features of this invention relates to method steps and apparatus whereby an improved surface finish is obtained, and whereby such improved surface finish is obtained while at the same time providing improved color definition in the case of sheets of variegated color.

The foregoing and other objects, features and advantages of this invention are further developed hereinbelow in connection with the following more detailed description of this invention and the exemplification thereof in connection with the accompanying drawings, wherein

FIGS. 2 to 5 inclusive are various views showing mechanisms associated with and used in operating the glossing roll shown in FIG. 1 wherein, more particularly.

*Preferred Materials Employed in the Process*

In the preparation of colored plastic products by means of the present invention, it is preferable to employ a composition which is thermoplastic and contains no material that requires drying, curing or vulcanization to condition it. Coloring materials preferably in solid, finely divided form are mixed with sufficient binder consisting preferably of a plasticized, thermoplastic, elastomeric polymer to render a sheet prepared therefrom, solid and compact, and yet flexible or pliable, resilient, and elastic. The materials are preferably such as will require no addition of volatile solvent or moistening agent to facilitate distribution of the coloring material in the plastic.

The thermoplastic, elastomeric polymers employed in the present invention are preferably vinyl polymers in the high molecular weight range. Preferred among the latter are the polymers of vinyl chloride, vinyl acetate, vinyl butyral, and copolymer of vinyl chloride and vinyl acetate. A copolymer which has proven satisfactory is one prepared from 93 to 95 percent vinyl chloride and the balance vinyl acetate, with an average molecular weight of approximately 24,000 as determined by the Staudinger method, and having a specific gravity of about 1.34 to 1.37, and softening at approximately 150° F. These above-mentioned polymer materials, when formed for present purposes, require no chemical or other treatment except preferably the addition of a plasticizer.

Plasticizers are employed which are compatible with these polymers, and which contain no constituents that are, as in the case of the polymers, reactive with atmospheric oxygen in the range of atmospheric temperatures. Examples of such plasticizers are tricresyl phosphate, dioctyl phthalate, dicapryl phthalate, dibutyl sebacate, dibutoxyl ethyl phthalate, dibutoxyglycol phthalate, polyethylene glycol di-2-ethyl hexoate, triethyleneglycol di-2-ethyl hexoate and the like.

Pigments or fillers employable are, for example, asbestine, barytes, calcium carbonate, calcium sulfate, clay, dolomite, mica, silica, slate flour, serpentine, talc. Synthetically prepared pigments, and natural pigments and others, including chrome green, chrome yellow, carbon black, titanium dioxide, are used for providing solid colored or variegated plastic products referred to herein. Dyes miscible or immiscible with the resins may, in certain instances, also be used.

Fibers, such as asbestos, cork, wood flour, cellulose fibers in general, and others, including animal fiber, such as leather, may be added.

The particle size of pigments or fillers should be such that they will preferably pass through a 325 mesh screen. Fibers, if employed, as for instance, wood flour, should pass through a 50 mesh screen, though finer grades can be used. Asbestos fibers, namely, "shorts," pass completely through a 10 mesh screen.

Traces of lubricants such as stearic acid, and metallic stearates, and of stabilizers such as basic lead carbonate, basic lead silicate, and basic lead stearate are generally added to the mix.

A mix for preparing a desirably colored plastic material contains substantially 50% to substantially 75% by weight of filler material, including color pigment alone or both pigment and fiber. These limits are varied not more than one to five percent. A ratio of pigment filler to fibrous filler that is particularly desirable for floor and wall covering, is two parts by weight of pigment to one part of weight of fiber. Preferably not more than 50% of fiber is used in the mixed filler, thoroughly and uniformly distributed.

Mixes for preparing colored sheets contain in parts by weight from about 16 to about 38 parts of the polymer, about 7 to about 18 parts of the plasticizer, and about 50 to about 75 parts of filler. Optimum proportions for wear surfaces are about 23 parts of polymer, about 12 parts of plasticizer, and about 65 parts of filter. A compounded sheet containing the various pigments and fillers in the proportions stated has a preferred specific gravity of 1.85 to 1.90. Depending on the types of fillers and to some extent the proportion thereof, the specific gravity may be as low as 1.5.

A number of complete formulae of mixes are set forth in Patent No. 2,558,378 which resulted from my application S.N. 722,291, filed January 15, 1947. Though specific proportions of materials are stated above, such proportions are variable in the present process depending upon the effects desired and the use of the final product.

Compositions of the character aforesaid which comprise a thermoplastic vinyl resin and a filler are referred to herein and in the claims for the sake of brevity as vinyl plastic composition, and sheets, particles and the like made therefrom are similarly referred to as vinyl plastic sheets, vinyl plastic particles, etc.

Under ordinary circumstances calendering of a thermoplastic composition such as a vinyl plastic mix is accomplished at substantially the mixing temperature thereof. Thus, if the mixing temperature is of the order 325° F. to 350° F. sheet formation by calendering is conventionally effected at like temperature, for the consistency of the composition at the temperature appropriate for the mixing is normally regarded as best suited for calendering the composition. The practice of this invention constitutes a departure from such conventional calendering practice and it is to be noted as being of critical importance that a substantial temperature differential be maintained so that the calendering temperature will be substantially below the mixing temperature and below the temperature at which the mix is initially sheeted and converted into granules. Thus, when the mixing temperature and that of initial sheeting and granule formation is in the aforesaid range of about 325° F. to about 350° F. and the maximum calendering temperature of the composition is as aforesaid about 290° F. or 300° F. it is apparent that the temperature differential maintained is at least 25° F. and preferably at least 35° F. If the maximum mixing temperature of about 375° F. for such composition is employed, and the aforesaid maximum calendering temperature of about 290° F. or 300° F. are employed, the temperature differential maintained is of the order of 85° F. or 75° F. respectively. Even greater temperature differentials may be utilized if the aforesaid maximum mixing temperature and the aforesaid minimum calendering temperature are employed, but for most purposes the maintenance of a temperature differential of about 25° F. to about 85° F. affords best results.

The temperature differential between the calendering temperature of thermoplastic compositions and mixing temperature of the compositions is roughly paralleled by the temperature differential maintained between the mixing temperature and maximum calender roll temperature, namely, the temperature of the calender roll that is maintained at the highest temperature. This temperature differential is apparent by comparing the aforesaid mixing temperature range of about 325° F. to about 350° F. with the aforesaid calender roll temperature of the roll 67 of about 260° F. to about 290° F., which latter temperatures are from 65° F. to 35° F. below the mixing temperature of 325° F. and from about 90° to about 60° F. below the mixing temperature of 350° F. Such temperature differentials ranging from about 35° F. to about 90° F. represent good practice, both as regards mixing temperatures of the range 325° F. to 350° F. and as regards the broader mixing temperature range of 300° F. to 375° F. However, in the case of a mixing temperature of about 375° F., it is apparent that the temperature differential would be as great as about 115° F. if the roll 67 is maintained at about 260° F.

With regard to the temperature of the cooler calender rolls which contact the surface of the calendered sheet opposite to the surface which contacts the roll 67, a very substantial temperature differential in relation to the mixing temperature is maintained. Thus in relation to the aforesaid mixing temperature range of 325° F. to 350° F. the maximum temperature of the roll 68 is 65° F. below the minimum mixing temperature of 325° F. while the minimum temperature of 225° F. of this roll is 125° below the mixing temperature of 350° F. Even greater temperature differentials as compared with mixing temperatures are applicable to the roll 66 when it is maintained at the aforesaid temperature of the range 180° F. to 220° F., namely about 170° F. or as much as 195° F. in the case of a mixing temperature of 375° F.

By thus maintaining the calender roll surfaces in contact with at least one of the surfaces of the calendered sheet at a temperature substantially below the mixing temperature, greatly improved results are afforded as regards pattern effect and color definition and distinctness in a sheet that has good surface characteristics, and this is especially the case when the calender roll surface in contact with one of the surfaces of the finished calendered sheet is many degrees below the mixing temperature and is of the order aforesaid. However, while too high calendering temperatures tend to result in blending or smearing of the colors, the conditions aforesaid afford better results than if very large temperature differentials are maintained between the stock temperature and the temperature of the calender rolls.

It is also to be noted that the roll 67 is maintained at a higher temperature than either of the rolls 66 or 68. This temperature differential between opposed calender rolls is important in that it increases good adhesion of the sheet to the roll 67 during the calendering operation, whereby entrapment of air is avoided as the sheet passes between rolls 67 and 68. Such adhesion is also preferably promoted by rotating the roll 67 at a somewhat greater speed as compared with that of the roll 66, although this is not essential. As aforesaid, the lapped sheets are fed into the cross-calendering operation at a temperature of about 200° F. to 250° F. or even at a lower temperature in the case of discontinuous operation. Such feeding temperatures are below the temperature of the roll 67 and this is desirable so as to offset the heat generated during calendering so that the composition during the cross-calendering will not attain a temperature substantially in excess of that of the roll 67 or above the aforesaid calendering temperature of the composition. However, the composition as carried by the roll 67 does attain a temperature substantially in excess of that of either of the rolls 66 or 68 as it passes between the rolls 67 and 68 and it is important to maintain the surface of the sheet opposite to that in contact with the roll 67 in contact with the calender surface at a temperature substantially below that attained by the composition during the calendering operation. When as above exemplified the calendered composition attains a temperature of about 290° F. the temperature maintained for the calender surface in contact with one surface of the composition while at said temperature is preferably that above mentioned for the roll 68, namely, about 30° F. to about 65° F. below the composition temperature.

The temperature of the rolls 66, 67 and 68 is separately maintained, preferably automatically, so as to maintain the required roll temperature for each roll as by regulation of appropriate media, such as steam or water circulated through the rolls. The rolls operated at the lower temperatures may have to have heat dissipated therefrom while for maintenance of higher temperatures heat may be supplied and controlled as by regulation of steam pressure used to heat the rolls. The amount of heat generated because of internal friction in the composition during calendering will vary depending largely on the calendering speed and the amount of reduction in sheet thickness, and the means for regulating the temperature of different calender rolls are adjusted depending on the particular operating conditions so as to maintain the aforesaid temperatures and temperature differentials. In practice a suitable production rate of the calendered sheet is about 25 to about 40 linear feet per minute.

A further feature of this invention relates to a method and means whereby the surface finish of the sheet may be still further improved. Furthermore specific features of this invention also relate to the combination of the calendering operation with a glossing or polishing operation whereby a product having superior all around properties as regards color definition and surface gloss is afforded by calendering under conditions favorable to the maintenance of sharp color definition followed by a glossing or polishing step whereby the surface finish is improved without detracting from the sharpness of the color definition or otherwise adversely affecting or altering the calendered sheet. Prior to the present invention the obtainment of the aforesaid objectives had been consistently difficult to accomplish. The use of known burnishing and finishing means had resulted in certain complexities in operation with retardation in production and had also resulted in undesirable non-uniformities in the finished product.

The foregoing objectives and advantages have been successfully obtained according to this invention by means of relatively simple equipment and by operations which can be conveniently and economically carried out at a high production rate. The apparatus employed includes simple attachments to the calender roll equipment of the type usually available in plants producing continuous plastic sheeting. In a preferred arrangement the calender may have a smooth surface glossing or polishing roll mounted adjacent thereto so that the sheet after calendering can be passed directly from the calender to said roll. The calendered sheet as produced in a heat plasticized condition by the calender rolls is made to adhere uniformly to the smooth surface of the glossing roll under critically controlled relative temperature conditions whereby a gloss finish may be imparted to one surface of the calendered sheet before the calendered sheet is passed on to cooling rolls and if desired to a winding roll. Under preferred conditions a high gloss is avoided, the sheet being provided with a more desirable satiny or semi-gloss finish. The operations are synchronized including drives for the calender and for the glossing roll and they are carried out so as to avoid any undue or appreciable change in the thickness or sectional dimensions of the calendered sheet and so as to minimize the development of stresses in the heated sheet which would have the effect of causing dimensional instability in the finished sheet. If a film or sheet of vinyl plastic composition is stretched while in a heated condition after it is once formed and if the sheet is then cooled in the stretched condition the internal stresses developed tend to cause shrinking of the sheet extending over a long time when the sheet is at atmospheric or room temperatures. The operations as carried out according to this invention not only avoid development of such stresses in the finished sheet, but also tend to reduce or relieve any stresses which may have been imparted to the sheet during prior processing. However, the principal advantage resulting from the association of the glossing roll with the calender resides in the improvement in the gloss finish which is obtained; and provided the required temperature differentials between those prevailing during calendering and that of the glossing roll optimum characteristics are afforded as regards the sharpness and distinctness of color definition in the finished marbleized sheet in combination with a very desirable gloss finish which is particularly important when the resultant sheet is to be used for floor or wall covering purposes.

If desired the calendered sheet not only may be provided with an improved gloss finish but also, as part of the same operation, may be embellished with ornamentations such as bosses.

The means and method of this invention for providing an improved gloss finish may be advantageously employed as an integral part of the apparatus and method hereinabove described in connection with FIGS. 1 to 7 whereby as the result of their further combination therewith the resulting product is additionally improved. Accordingly and for purposes of exemplification the glossing roll means for imparting the improved gloss finish has been shown in FIGS. 1 to 7 in combination with the cross-calender and cooling roll means, the glossing step performed thereby being a continuation of operations hereinabove described up to and including the cross-calendering step. After the lapped lengths 65 have been subjected to calendering by passage between the rolls 66 and 67 and between the rolls 67 and 68 the resulting calendered sheet 82, instead of being passed directly to the cooling rolls 74, is transferred after its passage between the calender rolls 67 and 68 so as to be immediately received on the surface of the polishing or glossing roll 78 which is adjacent the calender roll 68 and on which it is carried through a substantial distance of travel before being stripped therefrom. After the calendered sheet has been stripped from the glossing roll 78 it is passed to the cooling rolls 74 and thence, if desired, to a winder, as hereinabove described. The sheet retains the surface gloss imparted thereto after it has been cooled. Pressure rollers 79 and 80 are mounted adjacent the roll 78 for bringing the hot plastic sheet into close contact with the surface of the polishing roll and for promoting its intimate adhesion with the smooth surface of the polishing roll. The above mentioned rolls are horizontally mounted for rotation in the direction of the arrows and the glossing roll 78 and the pressure rollers 79 and 80, like the calender rolls 66, 67 and 68 are hollow or otherwise constructed so that gaseous or liquid media may be circulated therethrough for maintaining them at the requisite temperatures as will be more fully described hereinbelow.

Figures 1, 7:
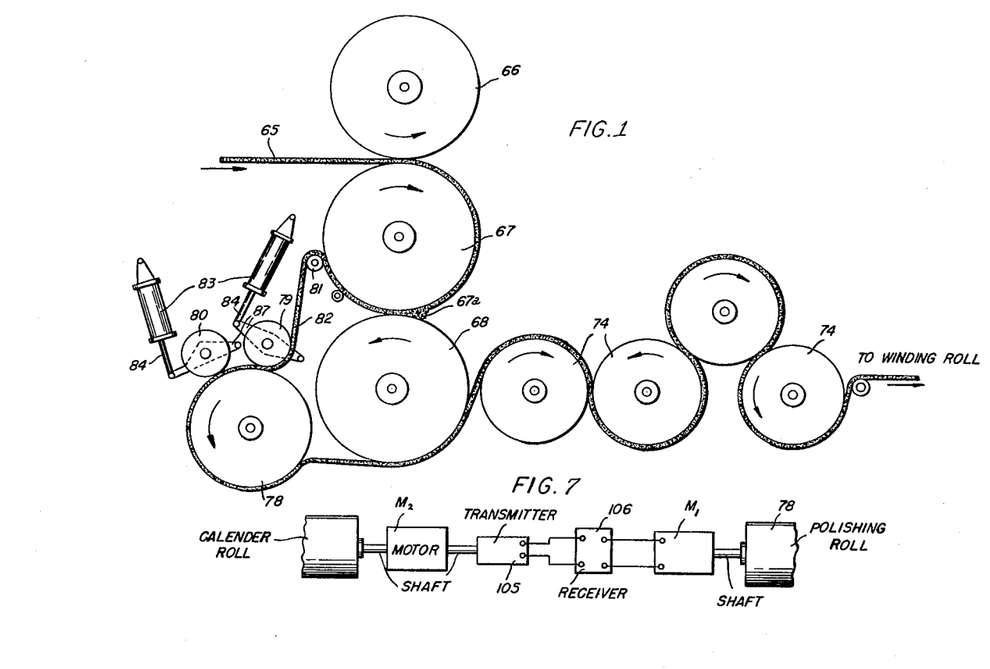
FIG. 1 is a diagrammatic elevational of apparatus wherein according to preferred practice of this invention a glossing or polishing roll is employed in combination with the calender and cooling rolls.
FIG. 7 is a diagram showing means for synchronizing the drives of the calender and glossing rolls.

A guide roll 81 is positioned adjacent the calender roll 67 so that a calendered sheet 82 coming from between the calender rolls 67 and 68 is guided in contact with and a substantial distance on the upwardly moving side of the clockwise rotating roll 67. The axes of the rolls 78, 79 and 80 are parallel to the axis of the guide roll 81 and to each other. The rolls 78 and 79 are positioned with respect to each other and with respect to the calender so that a calendered sheet from the roll 81 extends in contact with the roll 78 over a major portion of its counter-clockwise rotating cylindrical surface on its downwardly moving side and in contact with a lower portion of the counter-clockwise rotating cylindrical surface of the bottom calender roll 68 positioned between the roll 78 and the first cooling roll 74.

Though two pressure rolls 79 and 80 are shown, the roll 80 may be omitted if desired. Both rolls 79 and 80 are actuated by pressure applying means and are of such length as to apply uniform pressure along the full width of a calendered sheet 82 on the glossing roll 78.

The pressure applying means (details in FIGS. 2 and 3) associated with each roll 79 and 80 at opposite ends thereof, comprises a pneumatic pressure cylinder 83 from one end of which projects a piston rod 84. The upper end of each cylinder 83 swings on a support 85. The outer end of each piston rod 84 is pivotally linked with one end 86 of a lever element 87. The other end 88 of each lever element 87 is pivotally supported on a bolt 89. The axes 90 and 91 of the pressure rolls 79 and 80, respectively, are supported at each end by an adjacent lever element 87 between the ends 86 and 88 thereof.

Figure 2:
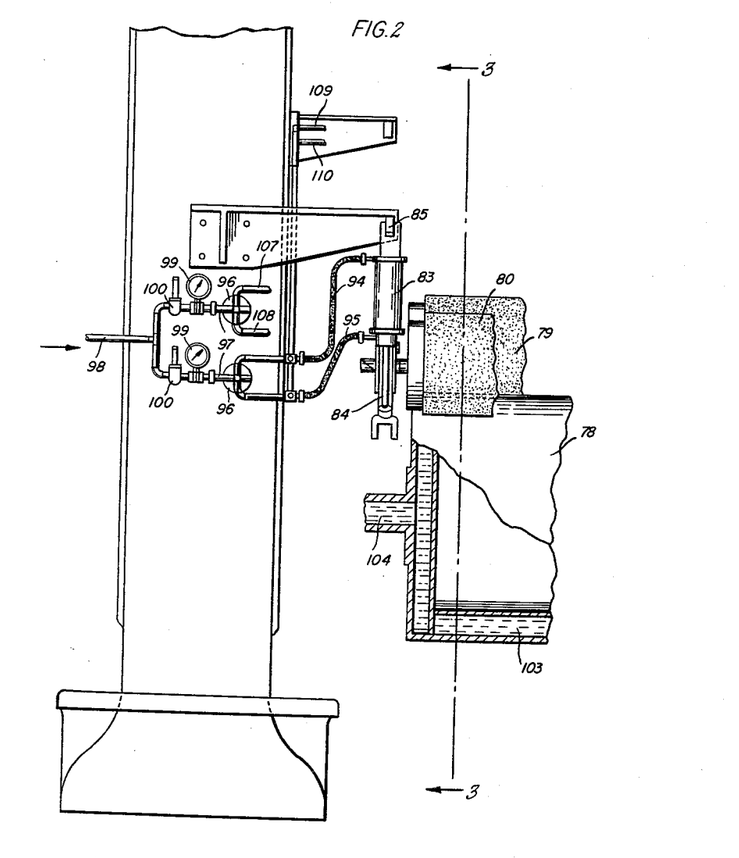
FIG. 2 is a fragmentary side elevation of the apparatus at one end of the glossing roll in association with mechanisms for performing a glossing operation.
Figure 3:
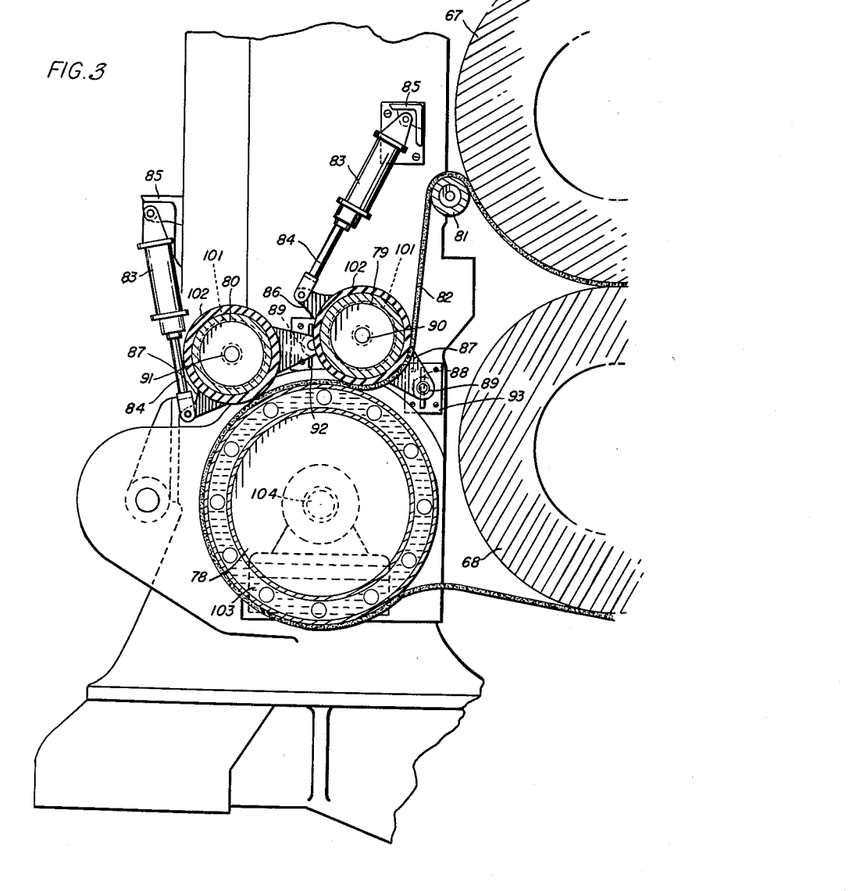
FIG. 3 is a vertical section taken on the line 15—15 of FIG. 2 in the direction of the arrows.
Figures 4, 6:
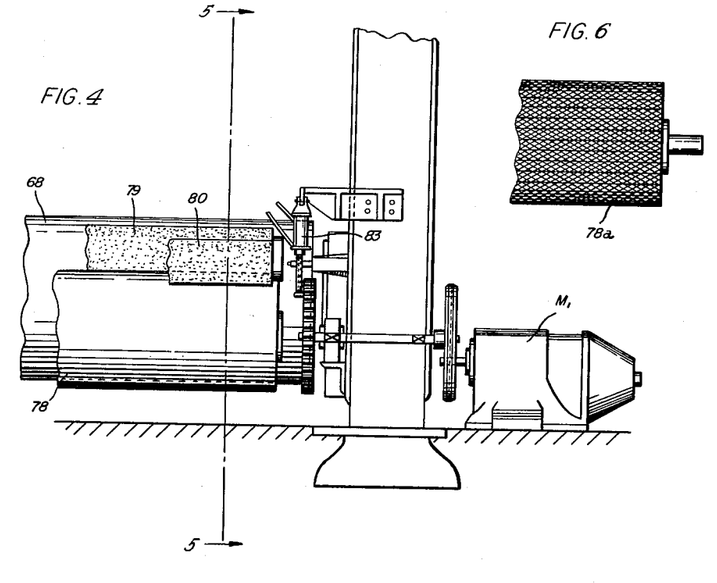
FIG. 4 is a fragmentary side elevation of the apparatus at the end of the glossing roll opposite the end shown in FIG. 2.
FIG. 6 is a fragmentary view of a glossing roll provided with an embossing surface.
Figure 5:
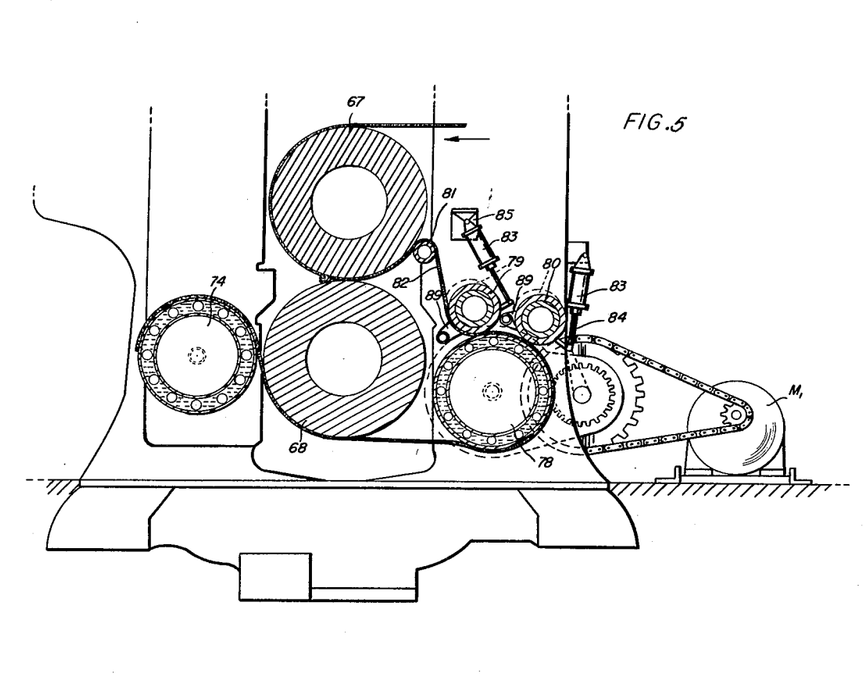
FIG. 5 is a vertical section taken on the line 17—17 of FIG. 4 in the direction of arrows.

Since the distance, maintainable between the surface of the glossing roll 78 and the surface of a pressure roll 79 or 80 while the pressure cylinders 83 are in operation, depends on the thickness of the sheet 82, such distance can be varied by adjusting the position of each bolt 89 with respect to the roll 78. For this purpose, each bolt 89 is movable toward or away from the roll 78 in a slot 92 in a fixed plate 93 provided for each bolt, and can be held in a fixed predetermined position in said slot.

For supplying compressed air, or other fluid, to the pressure cylinders 83 for operating the same, pipe connections shown in FIG. 2 are employed. A pipe connection 94 and a pipe connection 95 are made to upper and lower ends respectively of each cylinder positioned as shown in the drawing. For purposes of illustration, complete connections are shown for only one of the cylinders 83, namely, the one adjacent one end of the pressure roll 80. Connections 107 and 108, shown in part, are for the pressure cylinder 83 at the corresponding end of roll 79. Connections 109 and 110, shown in part, are for the two cylinders 83 at the opposite ends of rolls 79 and 80.

Referring again to the compressed air pipe connections for the pressure cylinder 83 in FIG. 2, which will serve as a description for corresponding connections for each of the other cylinders, pipes 94 and 95 are connected to a four-way valve 96 in a pipe connection 97 leading to an air inlet pipe 98. The pipe connection 97 is provided with a pressure gauge 99 and a pressure regulator 100. Air forced into the pipe 94 applies pressure to the head of the piston in cylinder 83 which in turn forces the roll 80 against a sheet on the roll 78. To move the roll 80 away from the sheet on the roll 78, the pressure on the head end of the piston is released, and air is admitted through pipe 95 to apply pressure to the crank end of the piston in cylinder 83.

Hand screws for forcing the pressure rolls against a sheet on the glossing roll 78 are not as desirable as the above-described pressure cylinders combined with the controls. The latter permit of more accurate adjustment.

The pressure rolls or so-called squeeze rolls 79 and 80 are steel shells 101 provided with a thick, outer, resinous covering 102 on the cylindrical surface. It has been found, in connection with the present invention, that synthetic rubbers such as Neoprene (polymer of chloroprene) and Buna N rubbers such as Hycar (copolymer of butadiene and acrylonitrile), and others, with a Shore "A" hardness of preferably from 60 to 80 are applicable as coverings for the pressure rolls, and are more desirable than natural rubber. The latter tends to oxidize rapidly and produces checks and crazes on the surface. Neoprene has been found highly satisfactory and is preferred in the apparatus described.

Rubbers with the above hardness provide the desired resiliency combined with pressure for the glossing operation. Softer rubbers do not exert enough pressure to cause a sheet to adhere firmly to the glossing roll 78, and, when excess pressure is applied they tend to delaminate from the steel shell of a pressure roll. When the rubbers are too hard, and the pressure too great, the pressure rolls distort a hot sheet as it proceeds through the squeezing operation.

Water-cooling of the pressure rolls 79 and 80 results in longer life of the rubber coverings since operation of the rolls at lower temperatures reduces the tendency toward oxidation and further vulcanization of the rubber. It also keeps the bonding adhesive, which is used to fasten the rubber covering 102 on the steel shell 101, at a lower temperature and prevents a delamination. With water cooling, the temperature on the outer surface of a pressure roll has been kept at about 230° F. when, under comparative conditions in absence of water cooling, it would be about 270° F. The temperature gradient in the rubber layer is such that the temperature at the surface of the steel shell is approximately that of the cooling medium.

The rolls 79 and 80 are mounted for free rotation by contact with a sheet under treatment on the roll 78. Positive driving means are employed for the calender rolls and for the glossing roll 78.

One means of heating the glossing roll 78, as shown, is a heating space 103 (FIGS. 2, 3 and 5) provided between double walls. The space is fed with a heating medium through a hollow shaft 104 at either end of the roll. The cooling rolls 74 are provided with similar means for the cooling medium.

For embossing as well as glossing, a roll 78a (FIG. 6) may be substituted for roll 78. Any raised design may be provided on the surface of roll 78a.

Electrical synchronization means (FIG. 7) are used to synchronize the drives of the calender and the polishing roll 78. For this purpose, the motor $M_2$ for the calender operates a transmitter 105 which generates a variable voltage depending on the speed of the motor $M_2$. This variable voltage controls the speed of a motor $M_1$ through a receiver 106. By this means, variations in calendering speeds result in corresponding variations in the polishing roll speeds. The sheet treated is moved lineally through the calender and on the glossing roll at the same rate, thereby preventing distortion while providing the gloss.

The glossing roll 78 is provided with a smooth, refractory, heat-conducting surface such as that obtained with highly polished steel or with polished chrome plating. The surface is preferably of uniform smoothness throughout and must be such that a thermoplastic sheet under treatment will adhere tightly to it. The temperature, maintained by circulation of steam or other thermal fluid in the roll 78, is dependent upon the composition of the thermoplastic film or sheet. The degree of gloss and the perfection of finish obtained are dependent on a number of factors, such as the smoothness of the roll surface, uniformity of direct contact between the sheet and the roll surface, the length of time the sheet is in contact with with the hot roll surface, the temperature of the roll surface, the temperature of the sheet entering the pressure or squeeze rolls, and the pressure exerted on the sheet by the pressure rolls. Each of these factors contributes to improvement in the finish.

The dwell of a sheet on the glossing roll 78 can be varied by changing its size, or by varying the speed of its operation. In some cases, a dwell of even one second on a steel glossing roll has provided a remarkably improved finish, particularly with a tightly adhering sheet. When used in combination with a calender for thermoplastic sheets, the glossing roll 78 and the pressure roll 79 should be placed as close as possible to the point where the sheet leaves the calender rolls. This guards against undue heat loss. The polishing operation applied alone to a performed cooled sheet is best preceded by a preheating step, and the sheet should be at a temperature at which it will adhere to the heated surface of the roll 78. Reheating a cooled plastic sheet, before subjecting it to the glossing process, does not produce as satisfactory results as those obtained by passing the sheet, kept closer to its temperature at formation, directly to the glossing roll. In reheating a previously cooled sheet, some of its substance is lost and the sheet does not subject itself to as good glossing action as when a freshly formed or freshly calendered hot sheet is used.

In the production of a marbleized thermoplastic sheet, the lower the range of temperature at which the sheet is calendered to bring about marbleization, the less the tendency of the plastic to flow and the less the blending of the colors, which results in producing marble patterns that are considered more attractive in the trade. However, a serious disadvantage in the low temperature calendering is that a rougher surface and a reduction in the desired gloss or sheet are obtained. Calendering alone does not assure both the desired marbleization and the improved glossing, since to obtain both, the opposite in temperature extremes is generally required. Considerable improvement is obtained in the finish of a marbleized product in the application of the present invention, by bringing a marbleized sheet from a calender immediately into contact with the glossing roll 78 without permitting the sheet to cool unduly before it reaches the hot glossing roll surface.

Upon transfer of the calendered sheet from the rolls of the cross-calender to the glossing roll 78, the temperature of the calendered sheet and the temperature of the surface of the glossing roll are such as to cause the sheet to become firmly adherent to the surface of the glossing roll when pressed thereagainst by either or both of the pressure rollers 79 and 80. It is also important to maintain a substantial temperature differential between the calendering temperature and the temperature of the glossing roll. Thus, while the temperatures maintained during calendering are, as aforesaid, substantially below the mixing temperature of the plastic composition, the temperature of the glossing roll is desirably maintained approximately at the mixing temperature or somewhat below the mixing temperature. For example, if the mixing temperature is about 350° F. the temperature of the glossing roll is desirably maintained at about 325° F. to 350° F. However, the sheet is taken to the polishing roll from the calender roll surface which, as aforesaid, is maintained at a temperature of the order of about 260° F. to about 290° F., while it is approximately at the temperature of said calender roll surface, namely, about 35° F. to about 90° F. below that of the glossing roll. Such a temperature differential is desirably maintained, although a somewhat lesser temperature differential of the order of about 25° F. will afford a very substantial improvement, as for example, if the maximum calendering temperature is about 290° F. and the glossing roll temperature is maintained at about 315° F.

It is also to be noted that the surface of the calendered sheet which is pressed into contact with the surface of the glossing roll, is the surface that was formed in contact with the calender roll 68 maintained at a temperature in the range 225° F. to 260° F. For polishing roll temperatures of the order of 315° F. to 350° F. this represents the maintenance of a temperature differential of about 55° F. to about 125° F. The formation of a surface of the finished sheet by successive contact with the calender roll surface and polishing roll surface having such a substantial temperature differential maintained between them is highly important in obtaining improved appearance according to this invention as regards the combined characteristics of good appearance of the marbleized pattern and a good gloss finish.

While the polishing roll is normally maintained at a temperature of the order of 315° F. to 350° F., a lower temperature down to about 275° F. could be employed if the calendering temperature is on the lower portion of the aforesaid calendering temperature range of 180° F. to 290° F. On the other hand if the composition formulation is such that the mixing temperature is in the upper portions of the range from about 300° F. to about 375° F. and if the calendering temperature is correspondingly in the upper portion of the 180° F. to 290° F. range or up to 300° F. then the polishing roll temperature may be as high as about 375° F.

Under the conditions aforesaid the marbleized surface of the calendered sheet when taken at calendering temperature to the surface of the glossing roll becomes softened due to the heat of the glossing roll and flows out under the pressure exerted by the pressure rollers 79 and 80 in conformity with the smooth surface of the glossing roll and a remarkable improvement in smoothness is obtained. A pressure of about 50 pounds per linear inch exerted by the pressure rollers 79 and 80 has been satisfactorily used to accomplish the desired pressure contact with the surface of the glossing roll without reducing the sheet thickness, injuring the pattern or otherwise altering the sheet in the condition as calendered except for the improvement in surface gloss.

Due to the fact that the peripheral speed of the glossing roll 78 is synchronized so as to be commensurate with that of calender roll 67 which carries the calendered sheet 82 after its formation and which, therefore, determines the speed at which the calendered sheet emerges from the calender, the calendered sheet is not subjected to tension or other strain while in the heated condition. It is also to be noted that the calendered sheet is stripped from the roll 67 while undergoing upward travel thereon just before passing over the stripping roll 81. In this way the weight of the calendered sheet assists in the separation of the sheet from the roll 67 thereby minimizing the tension for accomplishing the stripping of the sheet from the roll 67. Imposition of tension on the sheet is also minimized by permitting the sheet 82 to, in effect, fall under its own weight from the roll 81 so as to be received on the surface of the roll 78. It is also to be noted that the sheet 82 is stripped from the roll 78 during upward travel of the sheet on the surface thereof, thereby taking advantage of the weight of the sheet so as to accomplish the stripping while minimizing the tension imposed on the sheet.

While the provision of the glossing roll 78 has been illustrated and described in FIGS. 1 to 7 in combination with the cross-calendering rolls 66, 67 and 68 and the glossing roll possesses special utility and advantages when so used, the employment of the glossing roll is not limited to this particular application thereof. For example, if the finished product is the jaspe sheet as produced by any or all of other calender rolls the glossing roll attachment could be made appurtenant to this calender and employed in the same manner and for the purposes that have been hereinabove described in connection with FIGS. 1 to 7.

The aforesaid temperatures and temperature differentials are illustrative of those appropriate in connection with a vinyl plastic composition of the typical formulation hereinabove described. For different compositions the temperature prevailing and maintained during the different steps may vary somewhat as compared with those hereinabove given depending primarily on such factors as the softening point of the vinyl resin used, the proportion and kind of filler, and the proportion and efficacy of the plasticizer, those combinations which acquire desired consistency at a higher temperature being processed at correspondingly higher temperatures than those applicable in the case of compositions which acquire the same consistency at a somewhat lower temperature. However, in such case the temperature differentials maintained would remain substantially as hereinabove stated.

While certain temperature ranges have been indicated as occurring in the different operations and steps involved, the temperature that occurs in each of these operations or steps is normally held as rigidly constant as possible in any given production run and roll temperatures are maintained uniform throughout the length of the roll so that uniformity of the finished product will be maintained. Such uniformity is readily accomplished in the practice of this invention as well as exact duplication of results for different production runs. It is important in this trade that a pattern of a given sample be capable of reproduction and substantial duplication, this being a matter that has occasioned particular difficulty in the past. However, the practice of this invention affords a high degree of flexibility in that by varying the conditions that are maintained, even relatively slightly, different color, pattern, and other effects are obtainable. The principal factors as regards pattern effects of variegated color, either jaspe or marbelized, are the temperatures and temperature differentials maintained, the spacings between opposing calender rolls, and the size of the bank maintained at the nip between opposing calendar rolls.

In addition to the improvements and advantages that have been mentioned hereinabove, the cross-calendering operation is believed to have special advantages that are peculiar to a thermoplastic composition of the vinyl plastic type. Thus, when a vinyl plastic sheet is calendered in heat plasticized condition, it is believed that certain stresses are set up due to the orientation of the large vinyl molecular chains and of the fillers such as fibrous and other fillers. If a hot calendered sheet is cooled while these strains are retained, they tend to become later released, particularly if the calendered sheet is warmed, thus causing shrinkage. It is believed that the cross-calendering of the vinyl plastic sheets reduces the extent of the above mentioned orientation and that the stretch-strain tensions in the sheet are thereby reduced. Shrinkage of vinyl plastic sheets is also found to be the result of migration of plasticizers from the sheets into an adhesive used to attach the sheets to a base sheet, e.g., a saturated felt base sheet. Such shrinkage is found to take place in the opposite direction from the filler and vinyl resin orientation. Here again it is believed that the cross-calendering serves to reduce this shrinkage.

Products are obtainable at various stages in the above process which are adapted to find many uses. The process yields pigmented plastic granules or pellets of convenient sizes for handling in molding processes; and plain colored sheets and sheets of variegated color such as jaspe and marbleized are afforded in various thicknesses for various decorative purposes.

The invention hereinabove set forth is embodied and utilized in particular form and manner but may be variously embodied and utilized within the scope of the claims hereinafter made.

What is claimed is:

1. A method of imparting a smooth, glossy wear surface to a vinyl plastic sheet formed between heated calender rolls and containing about 50 to about 75 percent by weight of filler material which comprises firmly adhering the wear surface of said vinyl plastic sheet against a smooth solid surface without reducing the temperature of said sheet substantially below that at which it leaves said calender rolls, said solid surface being continuously maintained at a temperature between about 275° F. and about 350° F. and above the temperature of said heated calender rolls and at least 25° F. above the temperature of said singular solid surface at which temperature said sheet firmly adheres to said smooth solid surface, maintaining the contact between said sheet and smooth surface while avoiding lineal tension in the sheet and any pressure on the opposite surface of the sheet until said smooth gloss finish is acquired on said adherent surface, stripping said sheet from said smooth solid surface while said adherent surface of said sheet is at the temperature of said smooth solid surface and thereafter cooling said sheet.

2. The process of claim 1 wherein the smooth solid surface is a rotating calender roll.

3. A method of imparting a smooth, glossy wear surface to a vinyl plastic sheet which comprises firmly adhering the wear surface of a heated, preformed vinyl plastic sheet containing about 50 to about 75% by weight of filler material against a smooth rotating drum maintained at a temperature at least 25° F. above the temperature of the sheet while avoiding lineal tension in the sheet and without alteration of the thickness thereof, said sheet being maintained at a temperature of about 250° F. to about 300° F. at which temperature it firmly adheres to said drum, and said smooth surface of said drum being heated to a temperature between about 275° F. and 350° F., maintaining the contact between said sheet and said drum surface while avoiding lineal tension in the sheet and any pressure on the opposite surface of the sheet until said smooth, gloss finish is acquired on said adherent surface and stripping said sheet from said drum surface while said adherent surface of said sheet is at the temperature of said drum surface without exerting any substantial tension on said sheet and thereafter cooling said sheet.

References Cited in the file of this patent

UNITED STATES PATENTS

| | | |
|---|---|---|
| 2,176,153 | Semon | Oct. 17, 1939 |
| 2,239,780 | Fikentscher | Apr. 29, 1941 |
| 2,328,065 | Dreyfus | Aug. 31, 1943 |
| 2,451,597 | Wheeler | Oct. 19, 1948 |
| 2,526,318 | Battin | Oct. 17, 1950 |
| 2,551,005 | Johnson | May 1, 1951 |
| 2,551,966 | Pierce | May 8, 1951 |